United States Patent Office 3,057,852
Patented Oct. 9, 1962

3,057,852
METHOD OF PREPARING HEAT STABLE CELLULOSE ACETATE SULFATES
John E. Kiefer, Kingsport, Tenn., assignor to Eastman Kodak Company, Rochester, N.Y., a corporation of New Jersey
No Drawing. Filed Mar. 20, 1961, Ser. No. 96,706
7 Claims. (Cl. 260—215)

This invention relates to preparing cellulose acetate sulfates stable to heat and storage involving a treatment of the cellulose acetate sulfate in solution in its esterification mass with a selected content of water at a pH of no more than 0.5

In the manufacture of lower fatty acid esters of cellulose, sulfuric acid is normally used as the acylation catalyst. A portion of the catalyst combines with the cellulose in the esterification reaction and the combined sulfate groups therein cause the resulting cellulose ester to be unstable. To obtain cellulose acetates which are stable to heat, substantially all of the combined sulfate groups are hydrolyzed off. One of the common methods of removing combined sulfate groups from cellulose esters involves slowly adding water or aqueous acetic acid to the acetylation dope at the end of the esterification at high temperature. Another method for stabilizing cellulose acetates involves treating with hot water or steam, thereby removing combined sulfate groups. In the case of cellulose acetate sulfates, these stabilization methods would not be used since the combined sulfate groups impart desirable properties such as water solubility to those esters.

In U.S. patent application Serial No. 813,061 of myself and George P. Touey filed May 14, 1959, now Patent Number 3,000,876, issued September 19, 1961, a method is described for stabilizing cellulose acetate sulfates which involves the addition of 1–5% of urea to the cellulose ester.

One object of my invention is to make possible heat stable cellulose acetate sulfate salts without the addition of urea or some other compound being necessary. Another object of my invention is to provide a method for stabilizing salts of cellulose acetate sulfates unaccompanied by hydrolysis of combined sulfate groups. A further object of my invention is to prepare stable cellulose derivatives having good water solubility. Other objects of my invention will appear herein.

I have found that these and other objects are attained by treating a cellulose acetate sulfate salt within certain defined limits, which cellulose acetate sulfate salt has been first prepared by reacting upon cellulose with an esterification mixture comprising acetic anhydride, sulfuric acid and alkali metal salt. For instance, a sodium salt of cellulose acetate sulfate is conveniently prepared by reacting upon cellulose with an esterification bath made by mixing together acetic acid (as the solvent), acetic anhydride, sulfuric acid and as the alkaline salt sodium acetate, sodium sulfate, potassium carbonate, lithium sulfate, or the like. The esterifying solution used contains for each mole of cellulose 3.0 to 8.0 moles of acetic anhydride, 0.5 to 1.5 equivalents of lithium, sodium or potassium salt and 0.5 to 2.0 moles of $SO_4$ radical. There must be at least 1 mole of $SO_4$ present in the esterification mixture for each equivalent of alkali metal. It is preferable to employ an excess of the $SO_4$ ion. The presence of inert diluent such as acetic acid facilitates mixing, although the diluent can be dispensed with if thought desirable. The alkali metal may be introduced by any convenient means, such as a sulfate salt, an acetate salt, a carbonate salt or even in the form of the hydroxide. The $SO_4$ ion may be introduced either as alkali metal salt or as sulfuric acid, or both. The esterification reaction can be carried out at a temperature between about 18° C. and the boiling temperature of acetic acid (118° C.). The best results, however, are ordinarily obtained using temperatures within the range of 20 to 50° C. The reaction time required to produce a water soluble ester is governed to a considerable extent by the degree of excess of the $SO_4$ ion over the alkali metal ions and the reaction temperature employed. When the excess of $SO_4$ is high, such as 10 percent molar excess over the alkali metal ions, and a high reaction temperature (e.g. 40 to 50° C. is used, a water soluble product is ordinarily obtained within 10 to 20 minutes. With no excess or only a slight excess of sulfate ion over the alkali metal ions and a lower reaction temperature such as 20 to 30° C, a time as much as 8 to 12 hours may be required to produce a water soluble cellulose acyl sulfate salt.

After the esterification has been completed (that is when a sample of the esterified cellulose diluted with water makes a clear, fiber-free solution), the product is stabilized in accordance with my invention. This comprises adding water at a rapid rate until 5–40 percent of the total liquid in the mass consists of water. The pH of the dope should not be higher than 0.5 and if it is, it is adjusted to a value less than 0.5, such as by the addition of sulfuric acid. The mass is then mixed until a viscous dope is obtained, which is allowed to stand at 25 to 40° C. for at least one hour and preferably 1 to 4 hours. A time of treatment of less than 1 hour results in insufficient stability. If the stabilization lasts for more than 4 hours, the stabilization is effective but this additional time gives no advantage over the 4 hour treatment. At the completion of the stabilization the excess sulfate ion therein is neutralized with alkaline alkali metal compound. The salt cellulose acyl sulfate therein is then removed by precipitation such as with an alcohol and the resulting precipitate is washed and dried.

It is important in carrying out the stabilization that water be added to the mass at a rapid rate and the temperature be held below 40° C. Slow addition of water and high temperature results in the sulfate groups being hydrolyzed off. The water should be added at a rate that the liquid of the dope contains at least 5 percent water within 45 minutes of the start of its addition to the mass. By proceeding in this manner little or no hydrolysis of combined sulfate groups from the cellulose ester occurs; hence a product of good water solubility is obtained. If the stabilization treatment is carried out at a temperature lower than about 25° C., the product may have insufficient stability.

The salts of cellulose acylate sulfate stabilized as described herein will withstand heating at 150° C. for more than 2 hours or long storage at 40° C. without serious decomposition. When the stabilization treatment is omitted and no other stabilization is given, the cellulose acylate sulfate salt will decompose within 30 minutes at 150° C. If desired, the stabilized product obtained in accordance with our invention may also contain a small amount of urea, as taught in application Serial No. 813,061, if thought desirable. My invention relates to the alkali metal salts of cellulose acylate sulfates, in which the acylate portion is fatty acid radical of 2–4 carbon atoms and the combined sulfur content is at least 5 percent.

The following examples illustrate the advantages of my invention:

*Example 1*

82 parts of sodium acetate were dissolved in a mixture of 408 parts of acetic acid, 408 parts of acetic anhydride and 110 parts of 98 percent sulfuric acid at 30° C. This esterification solution was added to a mixture of 162 parts of wood pulp and 486 parts of acetic acid in a Werner-Pfleiderer mixer. The mass was mixed for 2 hours at 25° C. to form a swollen mass. A small sample of the product made a viscous fiber-free solution when diluted with water.

400 parts of water were added to the mixer and mixing was continued for 30 minutes forming a smooth viscous dope. This dope, which had a pH of 0.2, was allowed to stand for 3 hours at 25° C., whereupon 10 grams of sodium acetate were mixed into the dope to neutralize excess sulfuric acid. The sodium cellulose acetate sulfate thus prepared was isolated by precipitation into isopropanol. The precipitate was thoroughly washed with isopropanol to remove the acetic acid therefrom and was dried at 50° C. The product thus obtained contained 8.8 percent of sulfur and 22.5 percent of acetyl. A stable product was obtained, as shown by no decomposition after heating the dried product for 3 hours at 150° C. The cellulose acetate sulfate salt thus obtained was stored for 9 months and showed no sign of decomposition.

*Example 2*

This example illustrates the preparation of a cellulose acylate sulfate salt without the stabilization treatment of the invention.

The esterification described in the preceding example was repeated but the stabilization step was omitted. When the product reached the water soluble stage, 10 percent of sodium acetate was added to neutralize excess sulfuric acid and the sodium cellulose acetate sulfate obtained was precipitated into isopropanol. The precipitate was washed free of acetic acid with isopropanol and dried at 50° C. The product contained 8.9 percent of sulfur and 23.2 percent of acetyl. The product charred within 30 minutes when heated to 150° C. Another sample of the product was stored at 40° C. and showed decomposition within six weeks. In both cases a strong odor of acetic acid was given off.

*Example 3*

49.7 parts of finely powdered sodium sulfate were dissolved in a mixture of 116 parts of acetic anhydride and 35.5 parts of 98 percent sulfuric acid at 30° C. This solution was added to a Werner-Pfleiderer mixer containing 162 parts of wood pulp and 486 parts of acetic acid. The mass was mixed for 8 hours at 20° C., whereupon 300 parts of water were added to the mixer and the mixing was continued for 40 minutes or until a smooth dope was obtained. The mass had a pH of 0.3. The mass was allowed to stand for 2 hours at 40° C., whereupon 10 grams of sodium acetate were mixed into the dope to neutralize the excess sulfuric acid. The sodium cellulose acetate sulfate obtained was precipitated into isopropanol. The product was thoroughly washed with isopropanol until free of acetic acid and was dried at 50° C. The product contained 7.0 percent of sulfur and 24.2 percent of acetyl. A sample of the material was treated at 150° C. for 3 hours without any signs of decomposition.

*Example 4*

69 parts of potassium carbonate were dissolved in a mixture of 408 parts of acetic acid, 408 parts of acetic anhydride and 105 parts of 98 percent sulfuric acid at 30° C. The solution was added to a mixture of 162 parts of wood pulp and 486 parts of acetic acid in a Werner-Pfleiderer mixer and the mass was mixed together for 4 hours at 25° C. Thereupon 600 parts of water were added and the mixing was continued for approximately 20 minutes or until a smooth viscose dope was obtained. 10 grams of potassium carbonate were then mixed into the dope to neutralize the excess sulfuric acid. The potassium cellulose acetate sulfate obtained was isolated by precipitation into isopropanol. The product was thoroughly washed with isopropanol and dried at 50° C. It contained 8.4 percent of sulfur and 24.1 percent of acetyl and was found to be of good stability, as shown by the fact that heating for 3 hours at 150° C. gave no signs of decomposition.

*Example 5*

105 parts of lithium sulfate were dissolved in a mixture of 816 parts of acetic anhydride and 60 parts of 98 percent sulfuric acid at 30° C. The esterification bath was placed in a Werner-Pfleiderer mixer to which 162 parts of cotton linters were added. The mass was mixed for 20 minutes at 45° C., whereupon 400 parts of water were added to the mixer and the mixing was continued at 30° C. for 1 hour. The excess sulfuric acid was neutralized with 10 grams of lithium carbonate. The lithium salt of cellulose acetate sulfate thus obtained was separated out by precipitating into isopropanol. The product was washed free of acetic acid with isopropanol and thoroughly dried. Good heat stability was shown in its resistance to decomposition upon heating at 150° C. for 3 hours.

I claim:

1. In the preparation of cellulose acylate sulfate salts in which cellulose is converted thereto by esterifying it with a bath comprising fatty acid anhydride, sulfuric acid and alkali metal salt, the steps of stabilizing the product of that esterification which comprise in that order, (1) adding water to the cellulose acylate sulfate reaction-product-mass, at a rate whereby at least 5% of water is contained therein within at least 45 minutes, sufficient water to impart a 5–40% water content, (2) aging the mass at 25–40° C. for at least an hour, at a pH of no more than 0.5, (3) neutralizing excess sulfuric acid, and (4) separating the cellulose acylate sulfate salt thus obtained from the mass.

2. In the preparation of cellulose acetate sulfate salts in which cellulose is converted thereto by esterifying it with a bath comprising acetic anhydride, sulfuric acid and alkali metal salt, the steps of stabilizing the product of that esterification which comprise in that order, (1) adding water to the cellulose acetate sulfate reaction-product-mass, at a rate whereby at least 5% of water is contained therein within 45 minutes, sufficient water to impart a 5–40% water content, (2) aging the mass at 25–40° C. for at least an hour, at a pH of no more than 0.5, (3) neutralizing excess sulfuric acid, and (4) separating the cellulose acetate sulfate salt thus obtained from the mass.

3. In the preparation of cellulose acetate sulfate salts in which cellulose is converted thereto by esterifying it with a bath comprising acetic anhydride, sulfuric acid and sodium acetate, the steps of stabilizing the product of that esterification which comprise in that order, (1) adding water to the cellulose acetate sulfate reaction-product-mass, at a rate whereby at least 5% of water is contained therein within 45 minutes, sufficient water to impart a 5–40% water content, (2) aging the mass at 25–40° C. for at least an hour, at a pH of no more than 0.5, (3) neutralizing excess sulfuric acid, and (4) separating the cellulose acetate sulfate salt thus obtained from the mass.

4. In the preparation of cellulose acetate sulfate salts in which cellulose is converted thereto by esterifying it with a bath comprising acetic anhydride, sulfuric acid and sodium sulfate, the steps of stabilizing the product of that esterification which comprise in that order, (1) adding water to the cellulose acetate sulfate reaction-product-mass, at a rate whereby at least 5% of water is contained therein within 45 minutes, sufficient water to impart a 5–40% water content, (2) aging the mass at 25–40° C. for at least an hour, at a pH of no more than 0.5, (3) neutralizing excess sulfuric acid, and (4) separating the cellulose acetate sulfate salt thus obtained from the mass.

5. In the preparation of cellulose acetate sulfate salts in which cellulose is converted thereto by esterifying it with a bath comprising acetic anhydride, sulfuric acid and potassium carbonate, the steps of stabilizing the product of that esterification which comprise in that order, (1) adding water to the cellulose acetate sulfate reaction-product-mass, at a rate whereby at least 5% of water is contained therein within 45 minutes, sufficient water to impart a 5-40% water content, (2) aging the mass at 25-40° C. for at least an hour, at a pH of no more than 0.5, (3) neutralizing excess sulfuric acid, and (4) separating the cellulose acetate sulfate salt thus obtained from the mass.

6. In the preparation of cellulose acetate sulfate salts in which cellulose is converted thereto by esterifying it with a bath comprising acetic anhydride, sulfuric acid and lithium sulfate, the steps of stabilizing the product of that esterification which comprise in that order, (1) adding water to the cellulose acetate sulfate reaction-product-mass, at a rate whereby at least 5% of water is contained therein within 45 minutes, sufficient water to impart a 5-40% water content, (2) aging the mass at 25-40° C. for at least an hour, at a pH of no more than 0.5, (3) neutralizing excess sulfuric acid, and (4) separating the cellulose acetate sulfate salt thus obtained from the mass.

7. In the preparation of cellulose acylate sulfate salts in which cellulose is converted thereto by esterifying it with a bath comprising lower fatty acid anhydride, $SO_4$ radical and alkali metal salt, the steps of stabilizing the product of that esterification which comprise in that order, (1) adding water to the cellulose acylate sulfate reaction-product-mass, at a rate whereby at least 5% of water is contained therein within 45 minutes, sufficient water to impart a 5-40% water content, (2) aging the mass at 25-40° C. for 1 to 4 hours, at a pH of no more than 0.5, (3) neutralizing excess sulfuric acid, and (4) separating the cellulose acylate sulfate salt thus obtained from the mass.

References Cited in the file of this patent
UNITED STATES PATENTS 2,250,201     Malm et al. _____ July 22, 1941